Atterbury, Reddick & Atterbury.
Manufacture of Glass Articles.
No. 3,555.
Reissued Jul. 20, 1869.
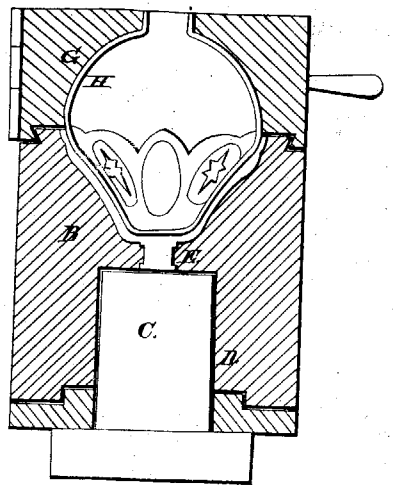
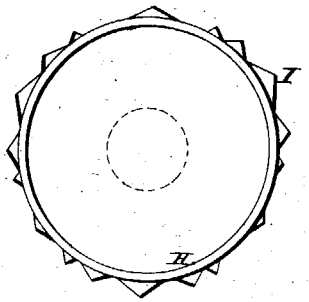
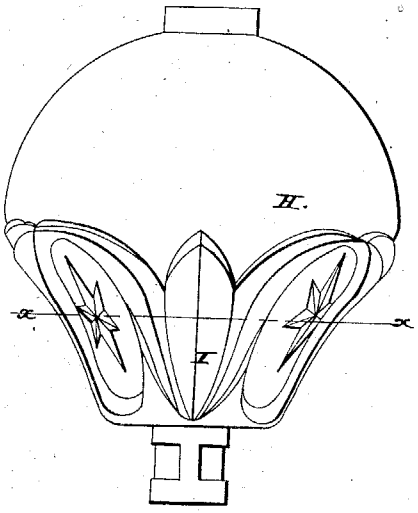
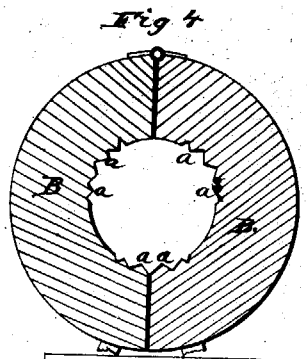
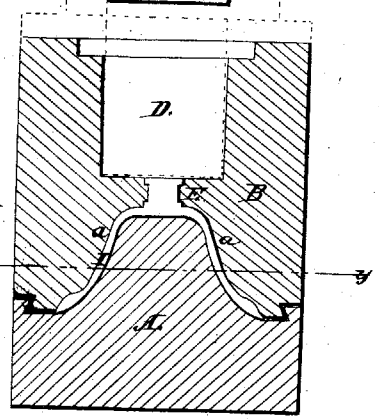
Fig. 3.
Inventor.
Jas. S. Atterbury
J. B. Atterbury
by
Mann, Herrick & Lawrence
Witnesses.
R. T. Campbell
D. V. Campbell

United States Patent Office.

J. S. ATTERBURY AND T. B. ATTERBURY, OF PITTSBURG, PENNSYLVANIA, FOR THEMSELVES, AND ASSIGNEES OF JAMES REDDICK.

*Letters Patent No.* 35,429, *dated June* 3, 1862; *reissue No.* 3,555, *dated July* 20, 1869.

DIVISION A.

IMPROVEMENT IN THE MANUFACTURE OF HOLLOW GLASS-WARE.

The Schedule referred to in these Letters Patent and making part of the same.

*To all whom it may concern:*

Be it known that J. S. ATTERBURY, JAMES REDDICK, and T. B. ATTERBURY, of Pittsburg, in the county of Allegheny, and State of Pennsylvania, have produced a new Manufacture of Hollow Glass-Ware in *bas-relief*, for which Letters Patent No. 35,429 were issued to them on the 3d day of June, 1862, and that the entire interest of said JAMES REDDICK in said invention has been assigned to us, as will appear by reference to the records of the United States Patent Office, liber X[10], page 300, of Transfers of Patents; and we do hereby declare that the following is a full, clear, and exact description of that part of our invention which is embraced in this division, marked "A," reference being had to the accompanying drawings, making a part of this specification, in which—

Figures 1 and 2 show an elevation and horizontal section of a specimen of the new manufacture.

Figures 3, 4, and 5, show means adapted for producing said specimen of the new manufacture.

The same letters of reference in the different figures indicate corresponding parts.

Under this patent the nature of our invention does not consist either in the method or the means for producing hollow glass-ware in *bas-relief*, as this was patented to us on the 4th day of March, 1862; but it consists in the new manufacture itself, to wit, hollow glass articles, with open illuminated *bas-relief* work, as herein described.

To enable others skilled in the art to produce our new manufacture, we will proceed to describe such means and methods as we have found practically useful in its production.

In producing a lamp-bowl, or "peg," with illuminated *bas-relief* work on its surface, as illustrated in figs. 1 and 2, a base-plate, A, with a hemispherical, conical, or other desired form of core on its top, is placed in a glass-manufacturer's press, as is usual in making ordinary articles of glass-ware.

Around and over this core a flask, or mould, B, of the form shown, is fitted so that spaces exist between the core and the mould, at those points where illuminated *bas-relief* work is to be moulded solid.

This mould has the design of the desired ornamental *bas-relief* work wrought in it, as shown in fig. 4, at *a a*. The core is smooth or plain on its surface.

The plunger C, with the follower of the press, is now adjusted for being lowered into the cylindrical chamber D, of the flask B, and just before it is depressed melted glass of red color, or other illuminated color, is put into the chamber D, and allowed to flow around the core, by the small passage E, and immediately thereafter the plunger C is pressed down upon the glass, and all remaining fluid glass forced out of the chamber D into the spaces between the core and the flask, in a manner to give a solid formation to the skeleton *bas-relief* work.

The dotted lines show how the plunger descends into the chamber D, and the position that the follower occupies when it has fully descended.

The next step is to invert the mould, with *bas-relief* work, plunger, and follower in it, as shown in fig. 5, leaving the base-plate and core in their places.

This being done, a two-part flask, G, is fitted on top of the inverted mould, as shown in fig. 5.

The two-part flask has a hole, *b*, in its top, and has a hinge-joint, on which it opens and closes.

The blower now gathers sufficient flint, or white glass on the end of his blow-pipe, and forms it into suitable shape to blow a lamp-bowl, or "peg."

This ready, the flask G is opened, and the prepared lump of glass is placed down on the inside of the illuminated skeleton *bas-relief* work.

The flask G having been closed, the blower blows through the orifice *b*, and out of the lump of glass which was laid on the illuminated *bas-relief* work, a flint or other white glass lamp-bowl, or "peg," H, is produced, as shown in fig. 5, and figs. 1 and 2, the illuminated work I standing in *bas-relief* on the outside of the bowl, and, by its brilliant color, in contrast with the light glass, produces a very handsome and showy effect.

Instead of blowing the lower half of the flint, or white-glass portion of the bowl, or "peg," the *bas-relief* work can be produced in the manner described and shown, and the mould reversed, and melted glass put into the mould and pressed by a plunger upon the inside surface of the *bas-relief* work, and the upper portion finished by blowing in the flask G, or in the old way by heating and bending over with shears or ordinary tools.

If we want to make a goblet, we press the *bas-relief* work as before described, reverse the mould, and then press the flint, or white glass in the *bas-relief* work.

As the forms and sizes of the articles vary, so also must the moulds be adapted thereto.

We have described and shown particularly but one style of article and *bas-relief* work, but it is obvious that the new manufacture can be extended to a great variety of articles by simply making changes in the forms of the moulds, and in the character of the design, still following the principle of operation set forth.

Having described all that part of our invention which relates to division "A,"

What we claim as new, and desire to secure by Letters Patent, is—

A new manufacture, consisting of blown glass-ware, with illuminated pressed relief-work on its surface, substantially as described.

J. S. ATTERBURY.
T. B. ATTERBURY.

Witnesses:
A. B. STEVENSON,
A. P. NORTON.